United States Patent [19]

Amsbury

[11] 4,130,941
[45] Dec. 26, 1978

[54] DISPLACEMENT GAUGE

[75] Inventor: Clifford R. Amsbury, King's Newton, England

[73] Assignee: Rolls-Royce Limited, London, England

[21] Appl. No.: 825,704

[22] Filed: Aug. 18, 1977

Related U.S. Application Data

[63] Continuation of Ser. No. 667,444, Mar. 16, 1976, abandoned.

[30] Foreign Application Priority Data

Mar. 20, 1975 [GB] United Kingdom ............... 11542/75

[51] Int. Cl.² ............................................. G01B 07/02
[52] U.S. Cl. ................................... 33/174 L; 33/172 E
[58] Field of Search ............. 33/172 E, 174 L, 174 P, 33/174 PC

[56] References Cited

U.S. PATENT DOCUMENTS

| | | | |
|---|---|---|---|
| 3,798,779 | 3/1974 | Gluck | 33/174 L |
| 3,869,799 | 3/1975 | Neuer et al. | 33/174 L |
| 3,888,012 | 6/1975 | Droz | 33/174 L |
| 3,945,124 | 3/1976 | Jacoby et al. | 33/174 L |
| 3,990,153 | 11/1976 | Calame | 33/172 E |
| 4,078,314 | 3/1978 | McMurtry | 33/172 E |

FOREIGN PATENT DOCUMENTS

| | | | |
|---|---|---|---|
| 2232858 | 1/1973 | Fed. Rep. of Germany | 33/174 L |
| 2611781 | 10/1976 | Fed. Rep. of Germany | 33/174 L |

*Primary Examiner*—Richard R. Stearns
*Attorney, Agent, or Firm*—Cushman, Darby & Cushman

[57] ABSTRACT

A displacement gauge comprising a body having a probe mounted in such a manner as to be capable of movement in three mutually perpendicular directions relative to the body. Three independent displacement indicating transducers associated with the probe provide signals which are indicative of its position relative to the body. The signals are subsequently processed and transmitted to a remote radio receiver which is adapted to display the outputs of the transducers.

6 Claims, 9 Drawing Figures

DISPLACEMENT GAUGE

This application is a continuation of application Ser. No. 667,444, filed Mar. 16, 1976, and now abandoned.

This invention relates to a displacement gauge and in particular to a displacement gauge which indicates displacement in three directions.

Displacement gauges have been suggested which indicate displacement in three directions. However the use of such gauges is restricted since by virtue of their construction, they are only capable of indicating displacement in one, or at the most two, directions at any one time.

According to the present invention, a displacement gauge for attachment to the movable head of a measuring machine or a machine adapted to perform measuring comprises a body, a probe capable of movement in three mutually perpendicular directions relative to the gauge body, three independent displacement indicating means mounted for cooperation with said probe and respectively adapted to provide an indication of the position of said probe in said three directions relative to said body.

The probe is preferably mounted on said body via mounting means, said probe being mounted on said mounting means and said mounting means in turn being mounted on said body.

The mounting means is preferably mounted on said body by means which allow relative movement between said mounting means and said body, and hence between said probe and said body, in a first direction.

The means mounting said mounting means on said body may comprise a set of lath springs.

The probe is preferably mounted on said mounting means by means adapted to allow relative movement between said probe and said mounting means in second and third directions which are perpendicular to each other and to said first direction of movement of said mounting means relative to said body.

The means adapted to allow relative movement between said probe and said mounting may comprise two pivots, one pivot interconnecting said probe and an intermediate member and the other pivot interconnecting said intermediate member and said mounting means, said two pivots being arranged such that their pivoting axes are perpendicular to each other and also to said first direction of movement of said mounting means relative to said body.

Alternatively said means adapted to allow relative movement between said probe and said mounting means may comprise two sets of lath springs, one set of said lath spring interconnecting said probe and an intermediate member, and the other set interconnecting said intermediate member and said mounting means, said two sets of lath springs being arranged such that the planes in which the first set lie are perpendicular to the planes in which the second set lie and also perpendicular to said first direction of movement of said mounting means relative to said body.

The displacement indicating means may comprise linear displacement transducers, each of which is adapted such that the output thereof is indicative of the position in one direction of said probe relative to said body.

The displacement indicating means may be provided with radio transmitting means adapted to transmit the outputs of said linear displacement transducers to remote radio receiving means.

The remote radio receiving means may be adapted to display the outputs of said linear displacement transducers.

According to a further aspect of the present invention, a method of measuring the x, y and z coordinates of an article to be measured comprises the steps of contacting the article to be measured with a displacement gauge, simultaneously producing an electrical signal representing each of the x, y and z coordinates of the gauge when so in contact, converting those signals into a radio signal and transmitting this radio signal to a position remote from the gauge and, at said position, converting said radio signals into a record representing each of said x, y and z coordinates.

The invention will now be described, merely by way of example, with reference to the accompanying drawings in which.

Figure 4:
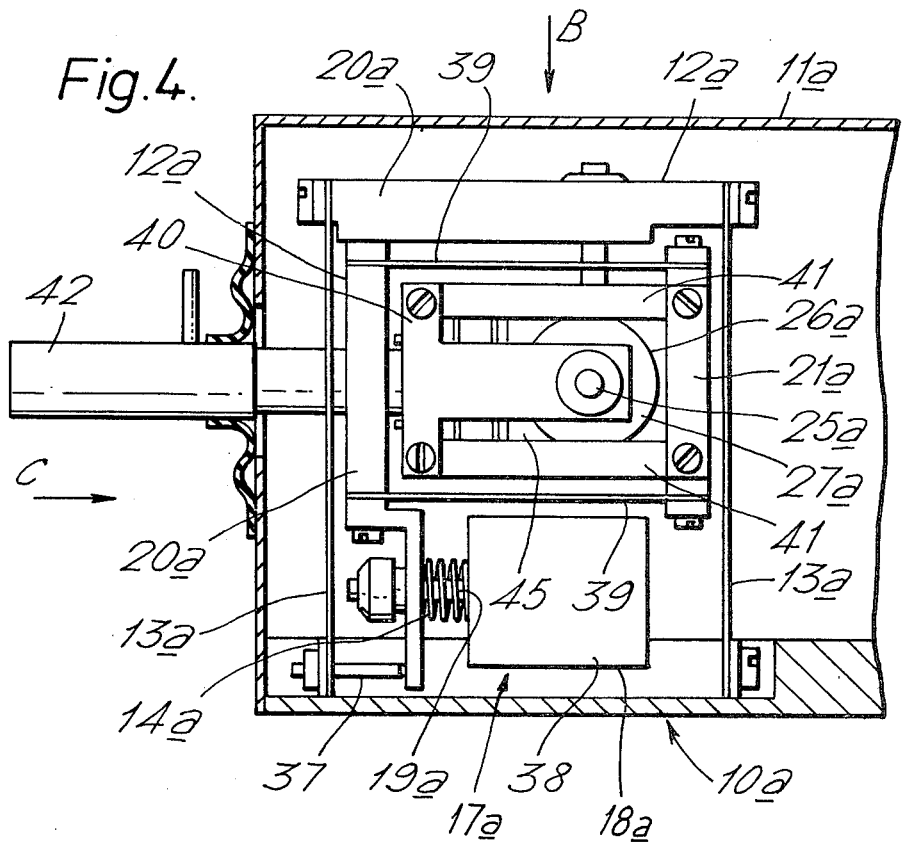
Figure 5:
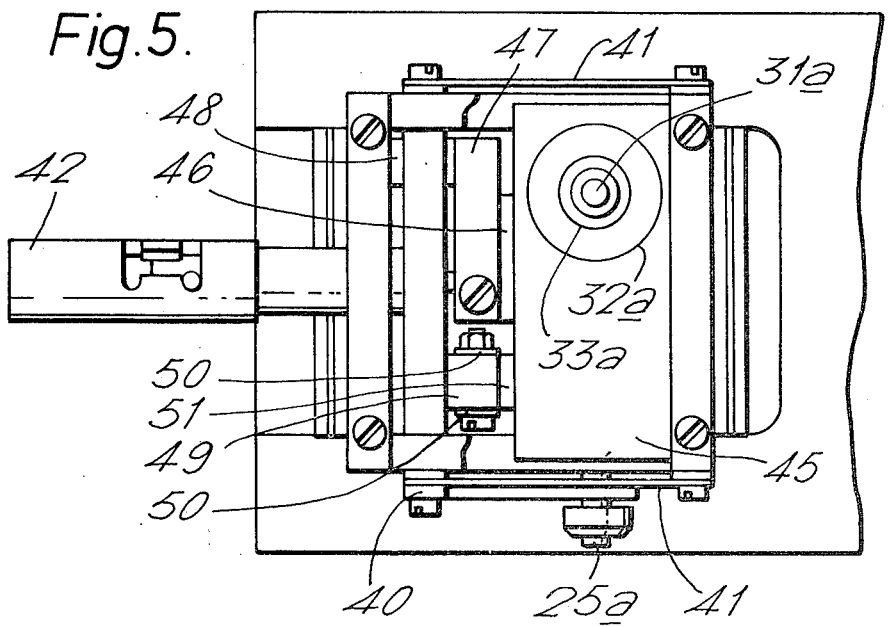
Figure 6:
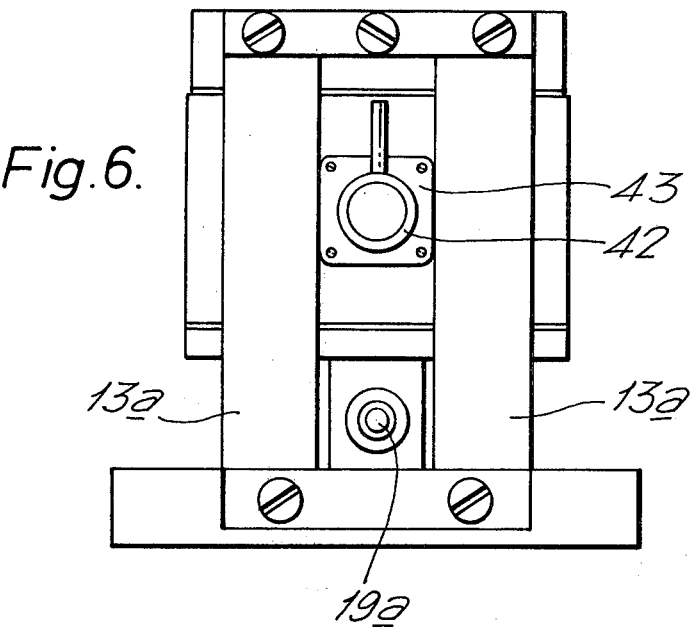
Figure 7:
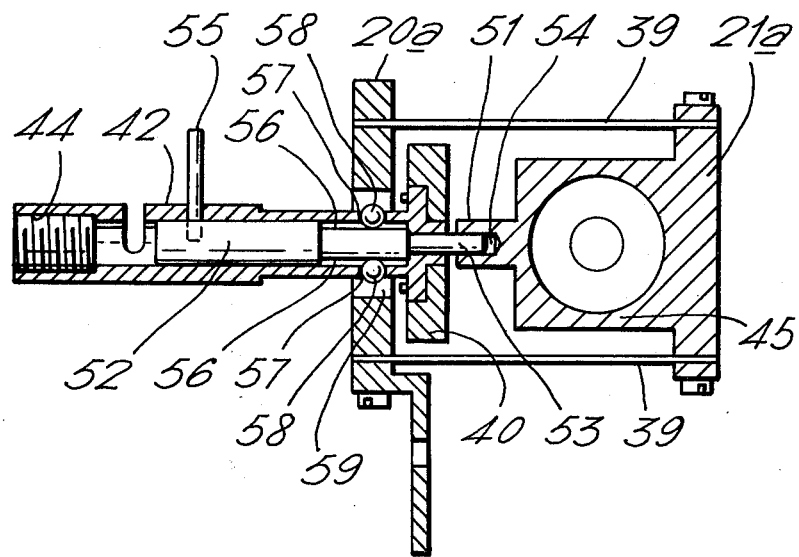
Figure 8:
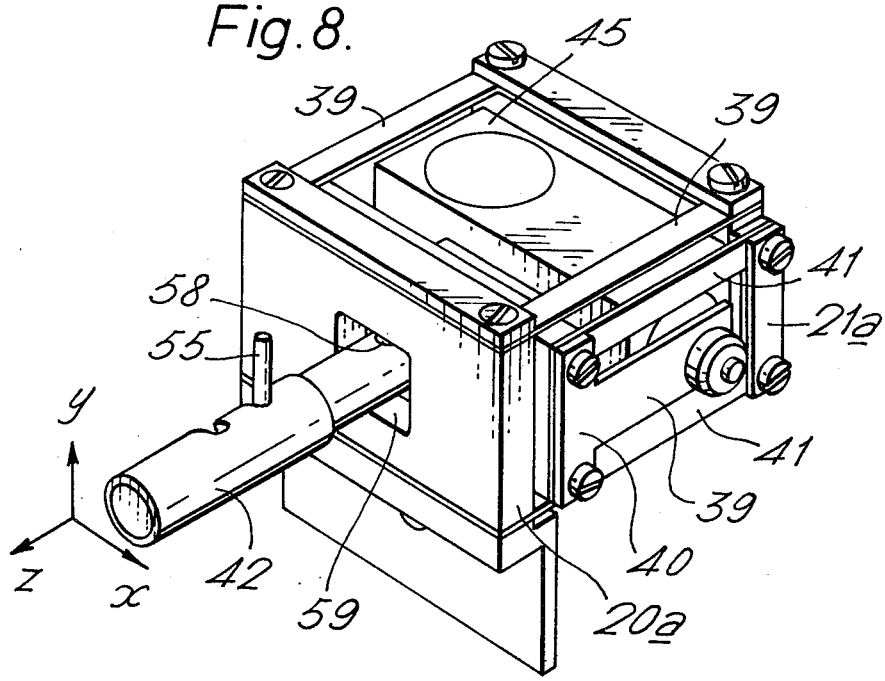
Figure 9:
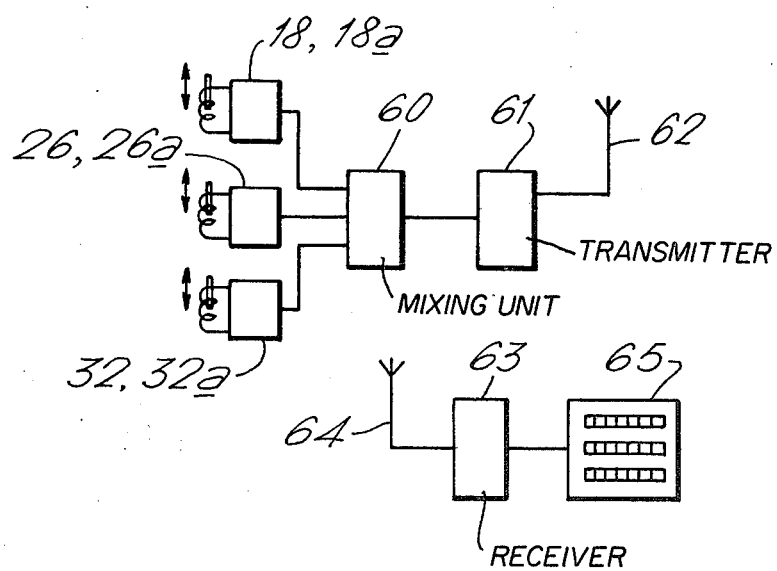

FIG. 4 is a partially sectioned side view of a second embodiment of a displacement gauge in accordance with the present invention, FIG. 5 is a view on arrow B of the displacement gauge shown in FIG. 4 with portions thereof not shown in the interests of clarity, FIG. 6 is a view on arrow C of the displacement gauge shown in FIG. 4, FIG. 7 is a sectioned side view of a portion of the displacement gauge shown in FIG. 4, FIG. 8 is a perspective view of a portion of the displacement gauge shown in FIG. 4, and FIG. 9 is a block diagram of an electronic circuit suitable for use with the displacement gauge of the present invention.

Figure 1:
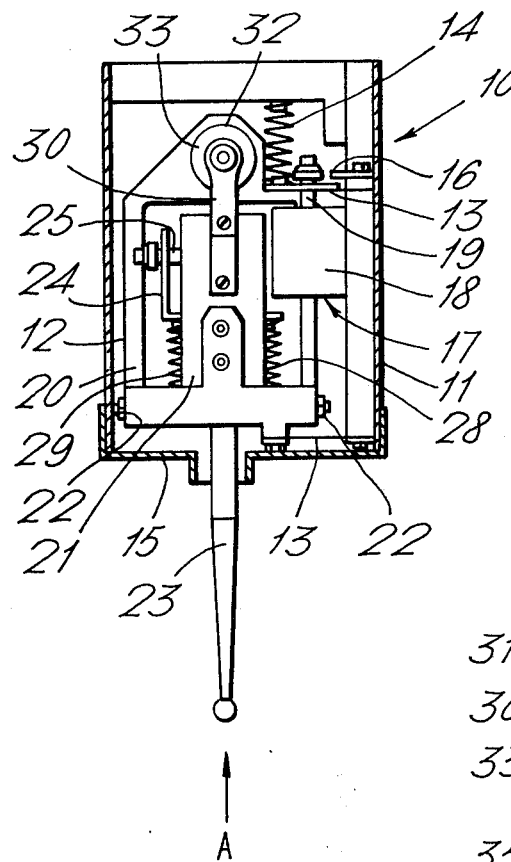
FIG. 1 is a partially sectioned side view of one embodiment of a displacement gauge in accordance with the present invention.

With reference to FIG. 1, a displacement gauge generally indicated at 10 comprises a case 11 within which is located, by means of two parallel lath springs 13, a mounting 12. The mounting 12 is located on the lath springs 13 in such a manner that it is permitted to move vertically (when viewed in FIG. 1) with respect to the case 11. The mounting 12 is biased in a downwards direction (again when viewed in FIG. 1) by a compression spring 14 which interconnects the mounting 12 and case 11. Movement of the mounting 12 is limited in a downward direction by contact with the base 15 of the case 11 whilst movement in an upward direction is limited by a stop 16 provided on the inner wall of the case 11.

The distance moved by the mounting 12 with respect to the case 11 is indicated by the output of a linear displacement transducer 17, the coil 18 and core 19 of which are attached to the case 11 and mounting 12 respectively.

The mounting 12 consists of a primary member or frame 20 and a secondary member or frame 21. The secondary frame 21 is partially enclosed by, and pivotally mounted at 22 within the primary frame 20. A probe 23 is in turn pivotally mounted at 24 within, and is partially enclosed by the secondary frame 21. The pivoting axes of the probe 23 and the secondary frame 21, and the secondary frame 21 and the primary frame 20 are arranged to be perpendicular in the manner of gimbals so that the probe 23 is permitted to pivot in two perpendicular directions.

Since the mounting 12 is permitted to move vertically with respect to the case 11 by the lath springs 13, the probe 23 is consequently capable of movement in three mutually perpendicular directions.

The probe 23 is provided with a substantially L-shaped cross-section portion 24 which defines a tertiary member or frame and which is adapted to carry the core 25 of a linear displacement transducer 26. The coil 27 of the transducer 26 is mounted on the secondary frame 21 so that the output of the transducer 26 is indicative of the pivotal position of the probe 23 with respect to the secondary frame 21.

Two compression springs 28 and 29 interconnect the portion 24 and the secondary frame 21 so as to resiliently bias the probe 23 with respect to the secondary frame 21 into a position in which the probe 23 is substantially perpendicular to the longitudinal axis of the coil 27. Stops (not shown) limit the pivotal travel of the probe 23 with respect to the secondary frame 21.

The secondary frame 21 is provided with an arm 30 which is adapted to carry the core 31 of a linear displacement transducer 32. The coil 33 of the transducer 32 is mounted on the primary frame 20 so that the output of the transducer 32 is indicative of the pivotal position of the secondary frame 21 with respect to the primary frame 20.

Two compression springs 33 and 34 interconnect the secondary frame 21 and the primary frame 20 so as to resiliently bias the secondary frame 21 into a central position, as shown in the drawing, with respect to the primary frame 20. Stops 35 limit the pivotal travel of the secondary frame 21 with respect to the primary frame 20.

The displacement gauge generally indicated at 36 in FIG. 4 has components which are common, in purpose, with some of the components of the displacement gauge 10. In the following description those components are suffixed by the letter a.

The displacement gauge 36 comprises a case 11a within which is located, by means of two parallel lath springs 13a, a mounting 12a. The mounting 12a is located on the lath springs 13a so as to move horizontally (when viewed in FIG. 4) with respect to the case 11a. Movement of the mounting 12a towards the left (again when viewed in FIG. 4) is limited by a stop 37 whilst movement towards the right is limited by abutment with a transducer housing 38. The mounting 12a is biased towards the left (when viewed in FIG. 4) by a compression spring 14a which interconnects the mounting 12a and the transducer housing 38.

The distance moved by the mounting 12a with respect to the case 11 is indicated by the output of a linear displacement transducer 17a the coil 18a of which is located within the transducer housing 38 whilst its core 19a is attached to the mounting 12a.

The mounting 12a includes a primary member or frame 20a, and a secondary member or frame 21a which are interconnected by a second set of parallel lath springs 39. The lath springs 39 are arranged so that the planes in which they lie are perpendicular to the planes in which the lath springs 13a lie. Consequently the secondary frame 21a is movable relative to the primary frame 20a in a direction which is perpendicular to the direction of movement of the primary frame 20a relative to the case 11a.

The secondary frame 21a is attached to a tertiary member or frame 40 by a third set of lath springs 41. The planes in which the lath springs 41 lie are arranged to be perpendicular to the planes in which both the lath springs 39 and 13a lie. Consequently the tertiary frame 40 is movable relative to the secondary frame 21a in a direction which is perpendicular to the direction of movement of the secondary frame 21a relative to the primary frame 20a. The manner in which the secondary frame 21a and tertiary frame 40 are interconnected can be more easily seen in FIG. 8.

Thus it will be seen that the tertiary frame 40 is movable in three perpendicular planes x, y and z relative to the case 11a (FIG. 8).

Figure 2:
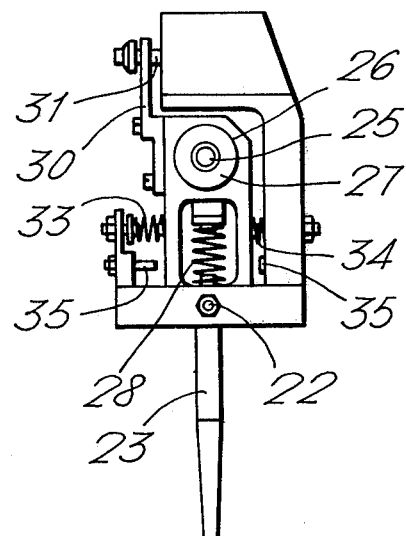
FIG. 2 is a side view of the mounting and probe of the displacement gauge shown in FIG. 1.
Figure 3:
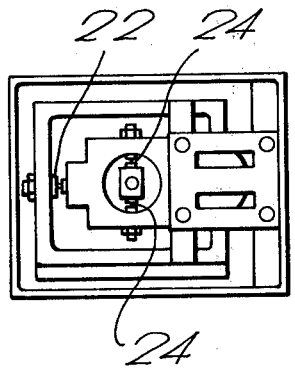
FIG. 3 is a view on arrow A of the displacement gauge shown in FIG. 1.

A probe support 42 is provided with a flanged portion 42 (FIG. 6) by means of which it is attached to the tertiary frame 40. The probe support 42 is provided with an internal screw threaded portion 44 (FIG. 7) which is adapted to receive a probe similar to that shown at 23 in FIGS. 1 and 2. The actual probe adapted to locate in the probe support 42 has been omitted in the interests of clarity. Since the probe support 42 is attached to the tertiary frame 40, it follows that both the probe support 42 and any probe attached to it are movable in three perpendicular planes relative to the case 11a.

The primary frame 20a is adapted to carry the core 31a of a linear displacement transducer 32a (FIG. 5). The coil 33a of the transducer 32a is mounted on the secondary frame 21a in the transducer housing 45, so that the output of the transducer 32a is indicative of the position of the secondary frame 21a with respect to the primary frame 20a.

Similarly the tertiary frame 40 is adapted to carry the core 25a of a linear displacement transducer 26a (FIG. 4). The coil 27a of the transducer 26a is mounted on the secondary frame 21a so that the output of the transducer 26a is indicative of the position of the tertiary frame 40 with respect to the secondary frame 21a.

Thus the outputs of the three linear displacement transducers 17a, 32a and 26a provide an indication of the position of the probe support member 42, and consequently any probe mounted thereon, in three mutually perpendicular directions relative to the case 11a.

In order to provide a repeatable starting position for the probe support member 42, each of the primary, secondary and tertiary frames 20a is provided with means adapted to return the frames to a known position after they have been deflected along their intended directions of travel. In the case of the primary frame 20a, its starting position is when it is in contact with the stop 37. As previously stated, the primary frame 20a is urged into contact with the stop 37 by the compression spring 14a.

The means adapted to return the secondary and tertiary frames 21a and 40 to a known position can be more easily seen in FIG. 5. The transducer housing 45 which is mounted on the secondary frame 21a is provided with a first boss 46, to which are bolted two parallel, spaced apart leaf springs 47, only one of which can be seen in FIG. 5. A second boss 48 located on the primary frame 20a is so dimensioned as to be interposed between and in contact with the free ends of the leaf springs 47. Consequently any movement of the secondary frame 21a relative to the primary frame 20a will, depending on the direction of that movement, result in one of the leaf springs 47 being deflected by the second boss 48. When the force which caused relative movement between the primary and secondary frames 20a and 21a is removed, then the deflected leaf spring 47 will return the primary and secondary frames 20a and 21a to their original relative positions.

The tertiary frame 40 is provided with a third boss 49 to which are bolted a second pair of leaf springs 50. The leaf springs 50 are similar to the leaf springs 47 and are mounted in a similar manner but are arranged so as to be disposed in a direction which is substantially perpendicular to that in which the leaf springs 47 are disposed. A fourth boss 51 is located on the transducer housing 45 so as to be interposed beteen and in contact with the free ends of the leaf springs 50. The cooperation between the leaf springs 50 and the fourth boss 51 is similar to that described previously with respect to the leaf springs 47 and second boss 48. Consequently if there is relative movement between the secondary frame 21a and the tertiary frame 40, removal of the force causing that movement will result in the deflected leaf spring 50 returning the secondary and tertiary frames 21a and 40 to their original relative positions.

It is sometimes desirable to lock one or two of the directions of movement of the probe support member 42 if there is no anticipated probe movement in those directions. The mechanism for locking one or two directions of movement of the probe support member 42 can be seen in FIG. 7. The probe support member 42 contains a cylindrical plunger 52 having an end portion 53 of reduced diameter. The end portion 53 is adapted to locate in a corresponding hole 54 provided in the first boss 46 on the transducer housing 45. Since the probe support member 42 is attached to the tertiary frame 40, it will be seen that when the end portion 53 of the plunger 53 is located in the hole 54, relative movement between tertiary frame 40 and the secondary frame 21a is prevented. A hand lever 55 is provided on the plunger 52 to facilitate its engagement with the first boss 51.

The plunger 53 is provided with two parallel flats 56 which are adjacent diametrically opposite holes 57 provided in the probe support member 42. In each of holes 57, there is located a ball member 58. The access hole 59 in the primary frame 20a for the probe support member 42 is of sufficient dimensions as to allow relative movement thereto of the probe support member 42. However if the plunger 52 is rotated by means of the hand lever 55 so that the flats 56 are no longer adjacent the holes 57, the ball members 58 will be urged into engagement with the primary frame 20a, thereby preventing relative movement between the primary frame 20a and the tertiary frame 40.

Thus it will be seen that it is possible to lock the primary and tertiary frames 20a and 40 and the primary and secondary frames 20a and 21a either independently or in combination.

The outputs of the linear displacement transducers 18, 26 and 32 in the case of the embodiment of FIGS. 1 to 3 and 18a, 26a and 32a in the case of the embodiment of FIGS. 4 to 8 are arranged to be in distinct frequency bands and mixed in a mixing unit 60 before being fed into a high frequency radio transmitter 61 having an aerial 62.

The mixing unit 60, transmitter 61, aerial 62 and batteries for powering the thus formed electronic package may conveniently be mounted on the case 11 in the first embodiment described and the case 11a in the second embodiment described. The signal from the transmitter 61 is received by a remote receiver 63 having an aerial 64. The receiver 63 is adapted to decode the signal by means of band pass filters into three separate frequencies which are then processed and presented on the unit 65 as digital measurements of the tri-directional movement of the probe 23 in the case of the first embodiment and the probe mounted on the probe support member 42 in the case of the second embodiment.

The displacement gauges 10 and 10a may be used on a numerically controlled machine for inspecting a workpiece during a sequence of machining operations. The displacement gauge 10 or 10a is mounted on the machine's tool magazine so as to be picked up automatically by the machine's movable head, as would be a normal tool, and used to inspect features of the workpiece by contacting the workpiece with the probe 23.

Alternatively the displacement gauges 10 and 10a could be used on a purpose-built inspection machine if such machine is provided with a movable head to which the gauges could be attached.

I claim:

1. A displacement indicating gauge for attachment to a movable head of a machine adapted to perform measuring operations comprising:

a body;

a probe;

primary, secondary and tertiary members;

first means for mounting said primary member on said body;

second means for mounting said secondary member on said primary member;

third means for mounting said tertiary member on said secondary member, said first, second and third mounting means permitting relative movement between said body and said primary member, said primary member and said secondary member, and said secondary member and said tertiary member in first, second, and third mutually substantially perpendicular directions, respectively;

means mounting said probe on said tertiary member with said probe extending beyond the bounds of said body;

three displacement sensing means respectively cooperating with said primary, secondary and tertiary members for providing an output representative of the position of said probe in said three directions relative to said body, including radio transmitting means for transmitting a signal representative of the position of said probe in said three directions;

remote radio receiving means for receiving said signal; and means for converting said received signal to a representation of the position of said probe in said three directions.

2. The displacement indicating gauge of claim 1 wherein said first means for mounting said primary member on said body comprises a set of lath springs.

3. The displacement indicating gauge of claim 1 wherein said second means for mounting said secondary member on said primary member for permitting relative movement between said primary member and said secondary member comprises a first pivot means, and said third means for mounting said tertiary member on said secondary member for permitting relative movement between said tertiary member and said secondary member comprises a second pivot means, said first and second pivot means having their pivoting axes perpendicular to one another and to the direction of movement of said primary member with respect to said body.

4. The displacement indicating gauge of claim 1 wherein said second means for mounting said secondary member on said primary member comprises a first set of lath springs and wherein said third means for mounting said tertiary member on said secondary frame comprises a second set of lath springs.

5. The displacement indicating gauge of claim 1 wherein said displacement indicating means comprise linear displacement transducers, the output of each of said transducers being a representation of the position in the corresponding direction of said probe relative to said body.

6. A method of measuring the x, y and z coordinates of an article comprising the steps of:

contacting the article with a displacement gauge, said gauge including a body, a probe, primary, secondary and tertiary members, first means for mounting said primary member on said body, second means for mouting said secondary member on said primary member, and third means for mounting said tertiary member on said secondary member, said first, second and third mounting means permitting relative movement between said body and said primary member, said primary member and said secondary member, and said secondary member and said tertiary member in first, second, and third mutually substantially perpendicular directions, respectively, means mounting said probe on said tertiary member with said probe extending beyond the bounds of said body, three displacement sensing means for respectively cooperating with said primary, secondary and tertiary members for providing an output representation of the position of said probe in said three directions relative to said body;

simultaneously producing electrical signals from said three sensing means representing each of the x, y and z coordinates of said probe when in contact with said article;

converting said signals into a radio signal;

transmitting said radio signal to a position remote from said gauge; and converting said radio signal into a representation of the position of said probe in said three directions.

* * * * *